(12) United States Patent
Wu

(10) Patent No.: US 10,581,299 B2
(45) Date of Patent: Mar. 3, 2020

(54) TRACKER AND MICRO POWER GENERATOR THEREOF

(71) Applicant: Wistron NeWeb Corp., Hsinchu (TW)

(72) Inventor: Shih-Ping Wu, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 389 days.

(21) Appl. No.: 15/495,446

(22) Filed: Apr. 24, 2017

(65) Prior Publication Data

US 2018/0048214 A1 Feb. 15, 2018

(30) Foreign Application Priority Data

Aug. 15, 2016 (TW) .............................. 105125906 A

(51) Int. Cl.
*H02K 7/18* (2006.01)
*F03G 1/00* (2006.01)
*F03G 7/08* (2006.01)
*H02K 7/10* (2006.01)
*G08B 21/02* (2006.01)

(52) U.S. Cl.
CPC ............. *H02K 7/1853* (2013.01); *F03G 1/00* (2013.01); *F03G 7/08* (2013.01); *G08B 21/023* (2013.01); *H02K 7/10* (2013.01); *H02K 7/1861* (2013.01)

(58) Field of Classification Search
CPC .......... B60K 6/383; B60K 6/48; B60K 20/40; B60W 20/10; B60W 20/30; F03B 13/1885; F03D 9/10; F03G 1/00; F03G 7/08; F16H 3/727; G08B 21/023; H02K 1/34; H02K 7/10; H02K 7/1853; H02K 7/1861; Y02E 10/38; Y02E 10/72; Y02E 10/723; Y02T 10/6221
USPC ....................................................... 340/539.13
See application file for complete search history.

(56) References Cited

U.S. PATENT DOCUMENTS 3,019,595 A * 2/1962 Murrle ..................... G04B 5/24
368/148
6,441,516 B1 * 8/2002 Kaelin ..................... F16F 1/10
185/45

(Continued)

FOREIGN PATENT DOCUMENTS

CN 103174774 A 6/2013
TW 190621 9/1992

(Continued)

*Primary Examiner* — Stephen R Burgdorf
(74) *Attorney, Agent, or Firm* — McClure, Qualey & Rodack, LLP

(57) ABSTRACT

A micro power generator is provided, including a cam structure, an electromagnetic unit, a first clutch, and a first energy converting unit. The electromagnetic unit is partially disposed in the cam structure, which includes a central shaft and a first shaft gear. The first shaft gear is rotated with the central shaft. The first clutch is telescoped on the central shaft, and rotated with the first shaft gear. The first energy converting unit is connected to the first shaft gear of the electromagnetic unit. In an energy-storing state, the first clutch is connected to the cam structure and is moved with the cam structure and the first shaft gear to move the first energy converting unit and to store the kinetic energy of the cam structure to the first energy converting unit. In a power-generating state, the first clutch is separated from the cam structure.

18 Claims, 11 Drawing Sheets

(56) References Cited

U.S. PATENT DOCUMENTS

| | | | |
|---|---|---|---|
| 2006/0250043 A1* | 11/2006 | Chung | H02K 5/08 310/216.004 |
| 2007/0079657 A1 | 4/2007 | Moteki et al. | |
| 2008/0174281 A1* | 7/2008 | Shau | H02K 7/1892 322/1 |
| 2009/0286651 A1* | 11/2009 | Tanaka | F02N 11/04 477/167 |
| 2010/0264668 A1* | 10/2010 | Hughes, Sr. | F03G 7/08 290/1 C |
| 2012/0091728 A1* | 4/2012 | Shuai | H02J 7/32 290/1 E |
| 2016/0020671 A1* | 1/2016 | Rastegar | H02K 7/1853 290/1 E |
| 2017/0364038 A1* | 12/2017 | Fulda | G04G 19/00 |

FOREIGN PATENT DOCUMENTS

| | | |
|---|---|---|
| TW | M395303 | 12/2010 |
| TW | 201529364 A | 8/2015 |

\* cited by examiner

TRACKER AND MICRO POWER GENERATOR THEREOF

CROSS REFERENCE TO RELATED APPLICATIONS

This Application claims priority of Taiwan Patent Application No. 105125906, filed on Aug. 15, 2016, the entirety of which is incorporated by reference herein.

BACKGROUND OF THE INVENTION

Field of the Invention

The present invention relates to a micro power generator, and in particular to a micro power generator utilized in a wearable device.

Description of the Related Art

Wearable devices with Internet of Things (IoT) functionality are small in size (like a watch), and utilize a small lithium battery to provide electricity. Commonly, in normal situations, a lithium battery can provide power for about 3~5 days. Therefore, a conventional pet/kid tracker has enough power to perform its function for about 3~5 days. If a lost pet or child are not found within 3~5 days, the pet/kid tracker cannot sustain its tracking function.

BRIEF SUMMARY OF THE INVENTION

In one embodiment, a micro power generator is provided. The micro power generator includes a cam structure, an electromagnetic unit, a first clutch, and a first energy converting unit. The electromagnetic unit is partially disposed in the cam structure, wherein the electromagnetic unit comprises a central shaft and a first shaft gear, and the first shaft gear is rotated with the central shaft. The first clutch is axially slidable on the central shaft, wherein the first clutch is rotated with the first shaft gear. The first energy converting unit is connected to the first shaft gear of the electromagnetic unit, wherein in an energy-storing state, the first clutch is connected to the cam structure and is moved with the cam structure and the first shaft gear to drive the first energy converting unit and to store kinetic energy of the cam structure to the first energy converting unit, and in a power-generating state, the first clutch is separated from the cam structure, and the first energy converting unit rotates the central shaft, and the electromagnetic unit generates electricity due to the rotation of the central shaft.

In one embodiment, a micro power generator is provided. The micro power generator is adapted to be operated in an energy-storing state and a power-generating state. The micro power generator includes a cam structure, a first clutch, a first shaft gear, a first clockwork gear, a first clockwork, a first unidirectional stopper and a first switch mechanism. The cam structure is rotatable about a central shaft and having a motor coaxially disposed therein, wherein the motor is rotatable about the central shaft. The first clutch is slidably movable along the central shaft to be connected to or separated from the cam structure. The first shaft gear is disposed on and interlocked to the first clutch, and being slidably movable along the central shaft with the first clutch. The first clockwork gear is meshed with the first shaft gear. The first clockwork is connected and interlocked to the first clockwork gear, and capable of being winded to store kinetic energy. The first unidirectional stopper is interlocked to the first clutch and being moved to mesh with or release from the first clockwork gear, wherein the first unidirectional stopper only allows the first clockwork gear to rotate in a winding direction of the first clockwork when meshing with the first clockwork gear. The first switch mechanism is connected and interlocked to the first clockwork to be moved toward or away from the first clutch, wherein when the micro power generator is operated in the energy-storing state, the first clutch is connected to the cam structure, the first unidirectional stopper is meshed with the first clockwork gear, and the motion of the cam structure drives the first clockwork gear to be rotated in the winding direction to wind up the first clockwork for storing kinetic energy, and when the micro power generator is operated in the power-generating state, the first switch mechanism moves toward and pushes against the first clutch to separate the first clutch from the cam structure, the first unidirectional stopper releases from the first clockwork gear, and the first clockwork releases the kinetic energy stored and drives the motor to generate electricity power.

In one embodiment, a tracker is provided. The tracker is capable of generating and delivering location signals. The tracker includes a power storage supply, a communication transceiver and a micro power generator. The communication transceiver is electrically connected to the power storage supply. The micro power generator is electrically connected to the power storage supply. The micro power generator includes a cam structure, an electromagnetic unit, a first clutch and a first energy converting unit. The electromagnetic unit is partially disposed in the cam structure, wherein the electromagnetic unit comprises a central shaft and a first shaft gear, and the first shaft gear is rotated with the central shaft. The first clutch is axially slidable on the central shaft, wherein the first clutch is rotated with the first shaft gear. The first energy converting unit is connected to the first shaft gear of the electromagnetic unit, wherein in an energy-storing state, the first clutch is connected to the cam structure and is moved with the cam structure and the first shaft gear to drive the first energy converting unit and to store kinetic energy of the cam structure to the first energy converting unit, and in a power-generating state, the first clutch is separated from the cam structure, and the first energy converting unit rotates the central shaft, and the electromagnetic unit generates electricity due to the rotation of the central shaft.

The micro power generator of the embodiment of the invention generates electricity by the activity of the pet or kid. The tracker utilizing the micro power generator of the embodiment can be charged to extend battery life, and the opportunity for find the lost pet or kid is therefore increased.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
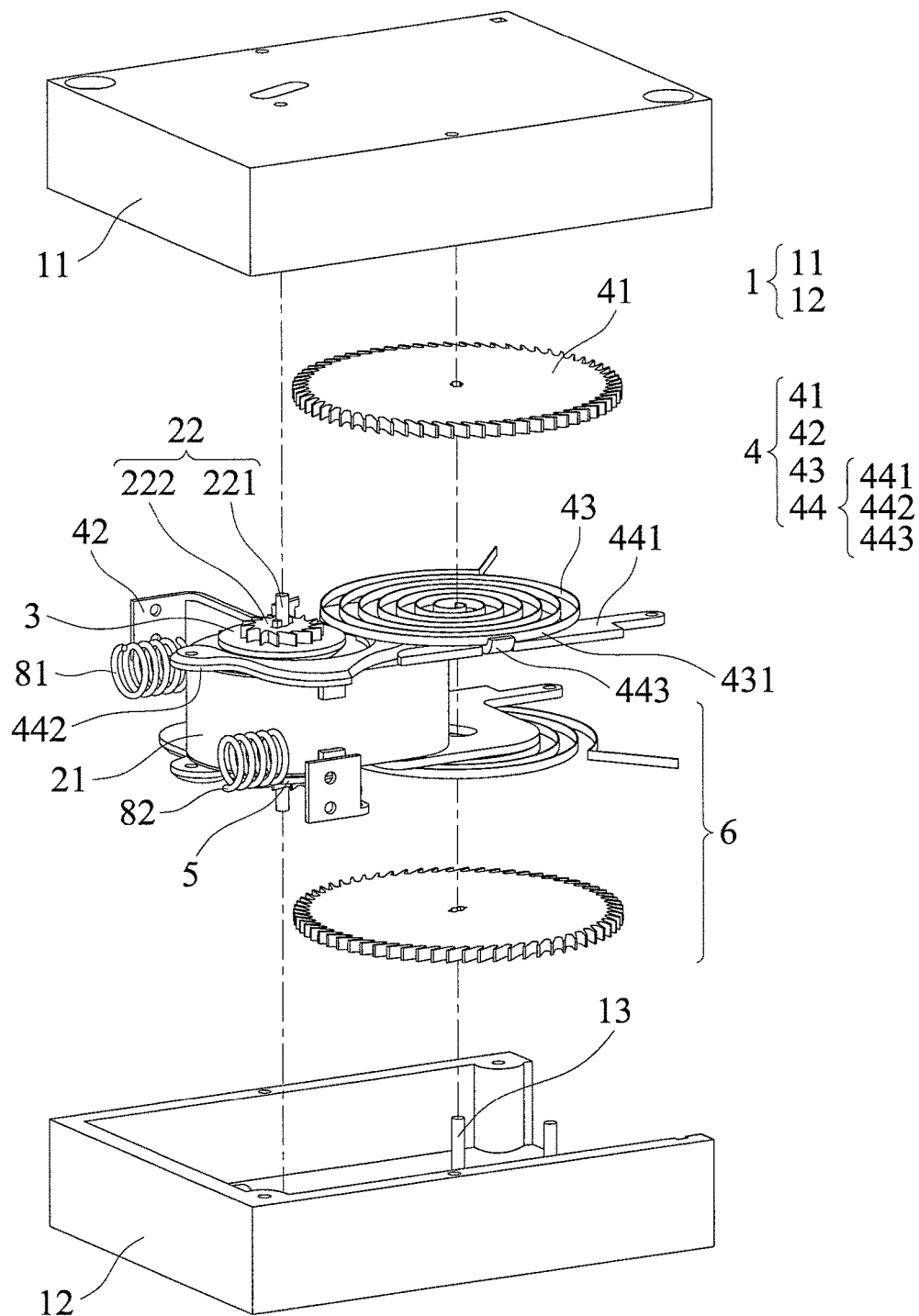
FIG. 1 shows a micro power generator of an embodiment of the invention.

FIG. 1 shows a micro power generator P of an embodiment of the invention. The micro power generator P includes a housing 1, a cam structure 21, an electromagnetic unit 22, a first clutch 3, a first energy converting unit 4, a second clutch 5, and a second energy converting unit 6. The housing 1 includes a first housing member 11 and a second housing member 12. The cam structure 21, the electromagnetic unit 22, the first clutch 3, the first energy converting unit 4, the second clutch 5, and the second energy converting unit 6 are disposed in the housing 1. The cam structure 21 is located between the first clutch 3 and the second clutch 5. The electromagnetic unit 22 is partially disposed in the cam structure 21. The electromagnetic unit 22 comprises a central shaft 221. The first clutch 3 is telescoped on the central shaft 221. The first clutch 3 is axially slidable on the central shaft 221.

The activity of the pet or kid rotates the cam structure 21. In an energy-storing state, the first clutch 3 is connected to the cam structure 21 and is moved with the cam structure 21, and the kinetic energy of the cam structure 21 is stored in the first energy converting unit 4. Similarly, the second clutch 5 is connected to the cam structure 21 and is moved with the cam structure 21, and the kinetic energy of the cam structure 21 is stored in the second energy converting unit 6. In a power-generating state, the first clutch 3 is separated from the cam structure 21. The first energy converting unit 4 rotates the central shaft 221. The electromagnetic unit 22 generates electricity due to the rotation of the central shaft 221. Similarly, the second clutch 5 is separated from the cam structure 21. The second energy converting unit 6 rotates the central shaft 221. The electromagnetic unit 22 generates electricity due to the rotation of the central shaft 221.

In the embodiment, there are two clutches and two energy converting units. However, the disclosure is not meant to restrict the invention. In one embodiment, the number of clutches, energy converting units, and electromagnetic units can be changed (for example, there may be only one clutch, one energy converting unit, and one electromagnetic unit, or there may be more than two clutches). To simplify the description, the detailed structures of the first clutch 3 and the first energy converting unit 4 are described as an example.

Figure 4:
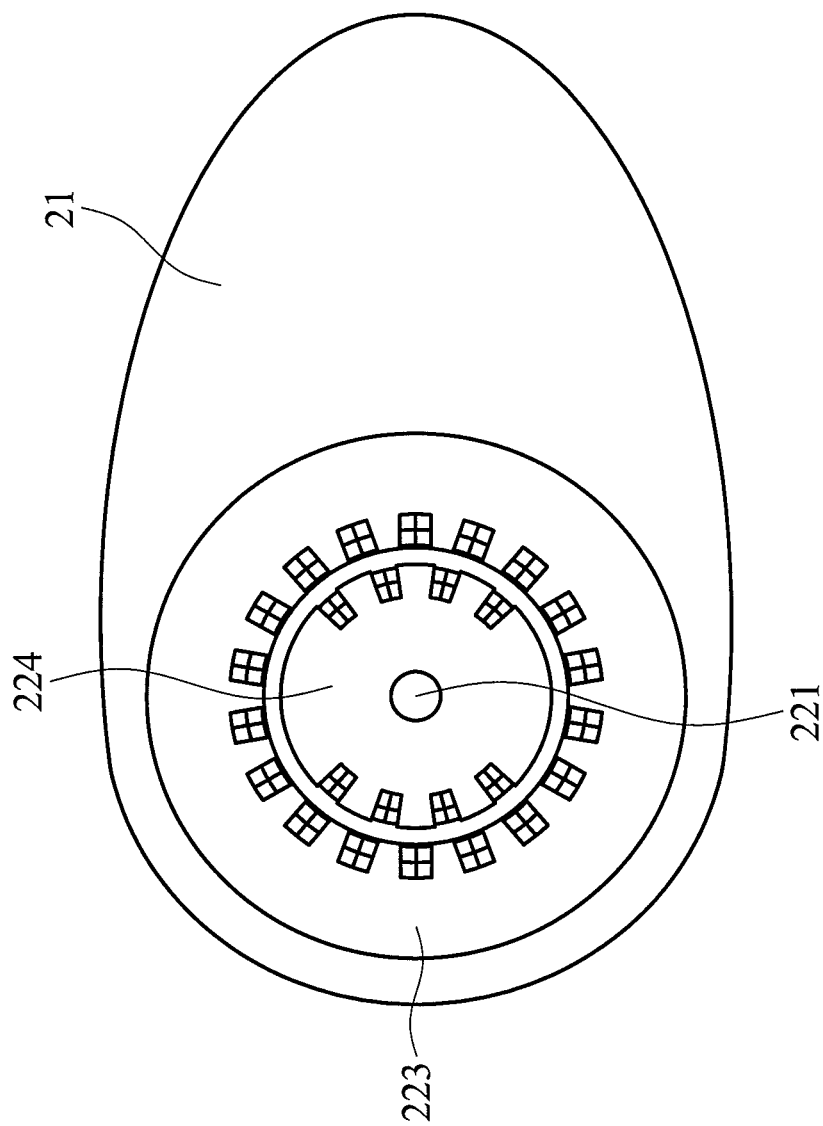
FIG. 4 shows the electromagnetic unit of an embodiment of the invention.

With reference to FIGS. 1 and 4, in one embodiment, the electromagnetic unit 22 comprises a central shaft 221, a first shaft gear 222, a stator unit 223 and a rotor unit 224. The stator unit 223 and the rotor unit 224 can be elements of a motor. The first shaft gear 222 is slidably telescoped on the central shaft 221. The first shaft gear 222 can be axially slid on the central shaft 221. The first shaft gear 222 is rotated with the central shaft 221. The first energy converting unit 4 comprises a first clockwork gear 41, a first unidirectional stopper 42, a first clockwork 43, and a first switch mechanism 44.

Figure 2A:
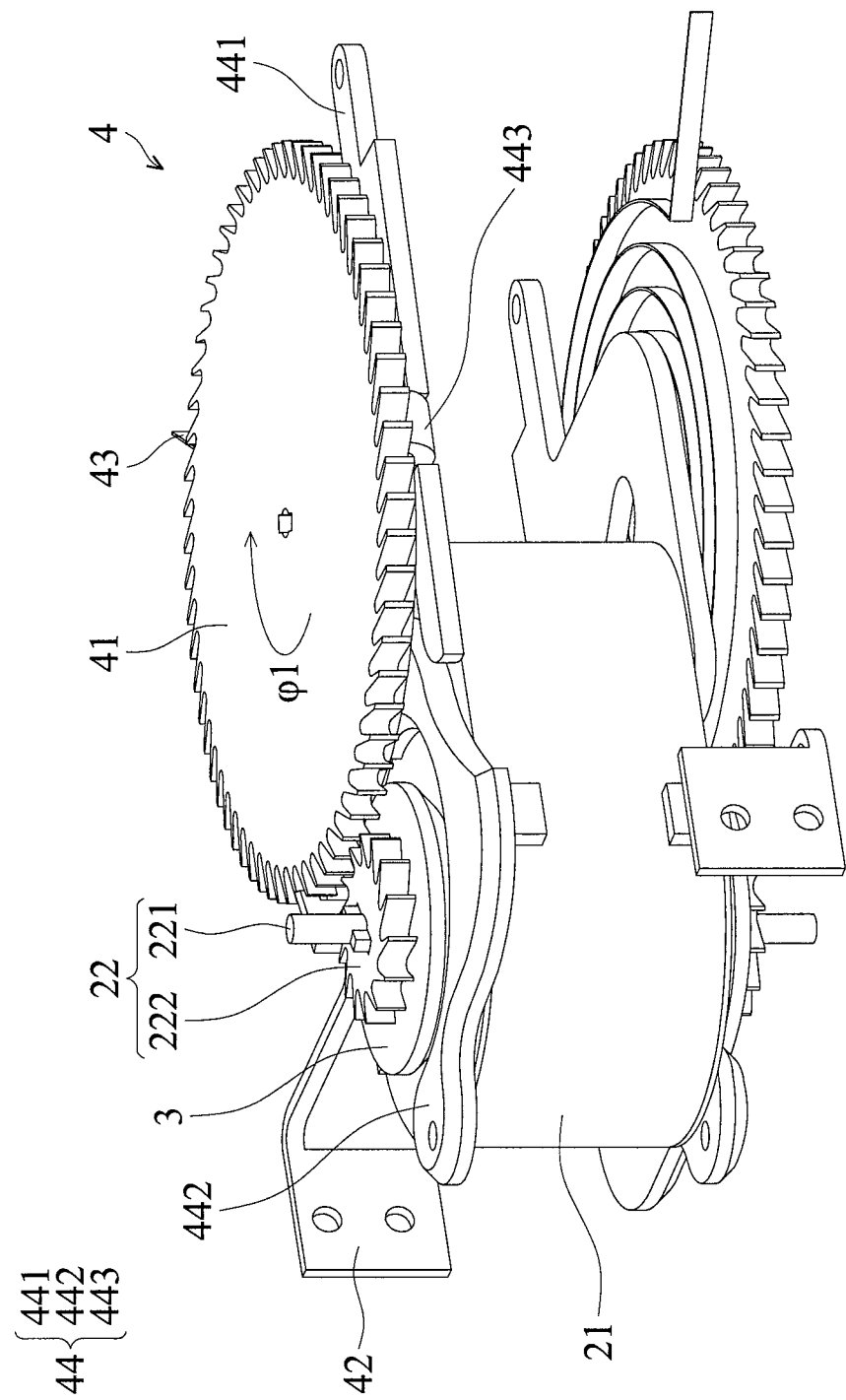
FIG. 2A shows the main structures of the micro power generator of the embodiment in the energy-storing state.
Figure 3A:
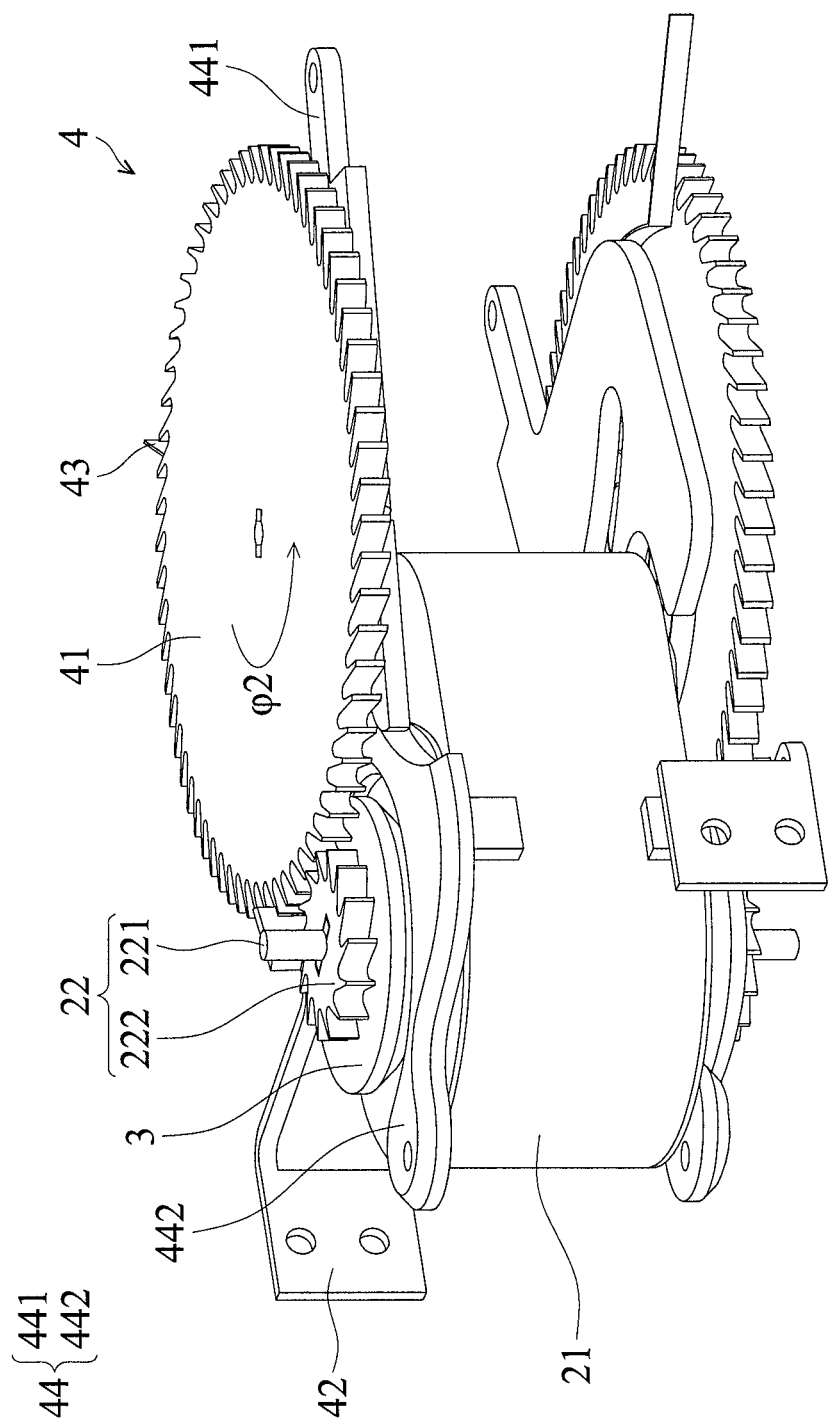
FIG. 3A shows the main structures of the micro power generator of the embodiment in the power-generating state.

FIG. 2A shows the main structures of the micro power generator of the embodiment in the energy-storing state. FIG. 3A shows the main structures of the micro power generator of the embodiment in the power-generating state. With reference to FIGS. 1, 2A and 3A, no matter whether the power generator is in the energy-storing state or the power-generating state, the first clockwork gear 41 meshes with the first shaft gear 222. The first clockwork 43 is moved with the first clockwork gear 41. The first switch mechanism 44 is connected to the first clockwork 43.

In one embodiment, the first shaft gear 222 is an elastic ratchet wheel. The teeth of the ratchet wheel are inclined. In the energy-storing state, when the first unidirectional stopper 42 stops the first clockwork gear 41 to prevent the first clockwork gear 41 from rotating in a direction, the first shaft gear 222 is still moved by the cam structure 21 and rotated in the direction.

Figure 2B:
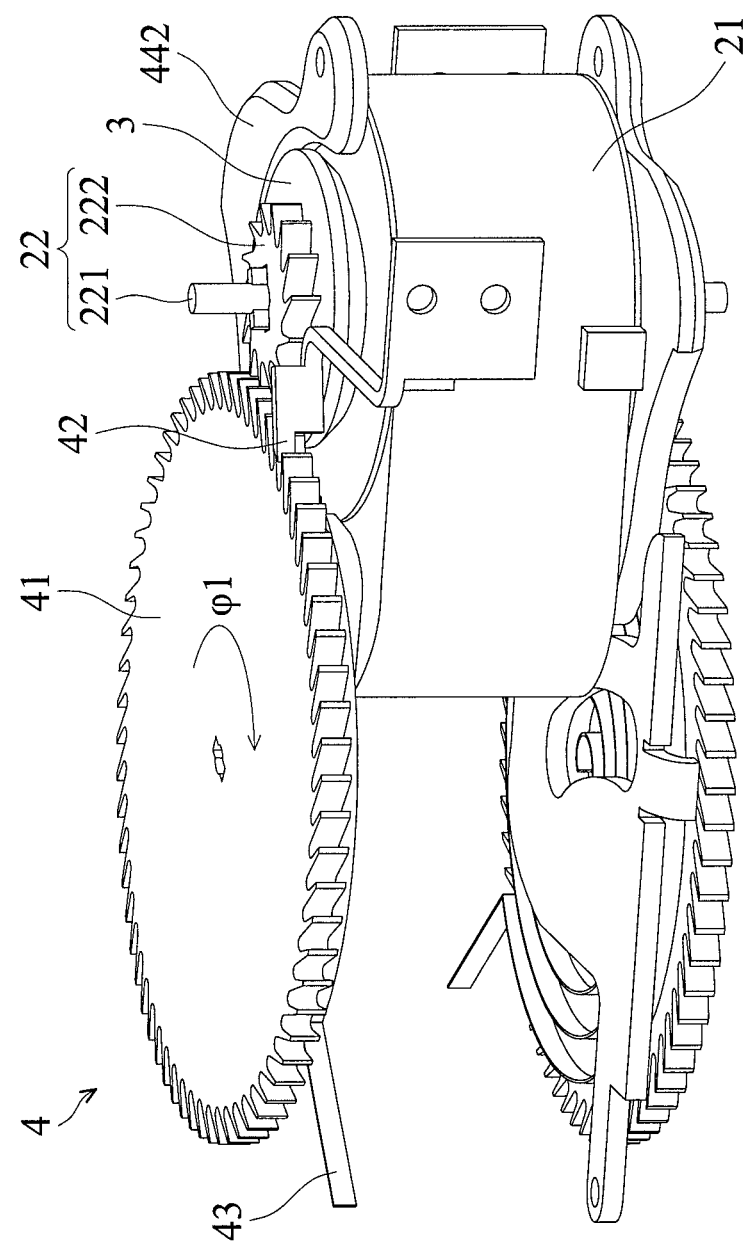
FIG. 2B shows the main structures of the micro power generator of the embodiment in the energy-storing state from another angle.

FIG. 2B shows the main structures of the micro power generator of the embodiment in the energy-storing state from another angle. With reference to FIGS. 2A and 2B, in the energy-storing state, the first unidirectional stopper 42 abuts the first clockwork gear 41. When the cam structure 21 is displaced, the first clutch 3 and the first shaft gear 222 are rotated, and the first shaft gear 222 rotates the first clockwork gear 41 in a single direction. The first clockwork gear 41 is moved with the first clockwork 43 to transform the kinetic energy into an elastic energy to be stored in the first clockwork 43.

Figure 3B:
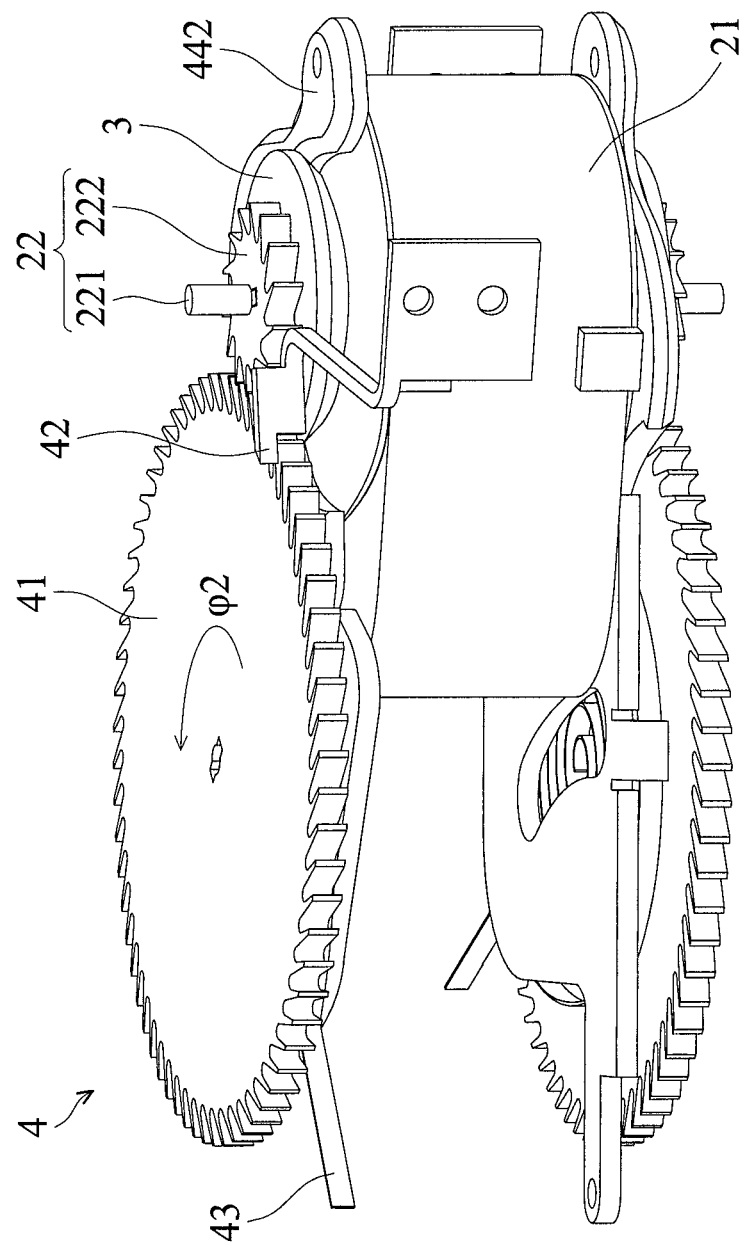
FIG. 3B shows the main structures of the micro power generator of the embodiment in the power-generating state from another angle.

FIG. 3B shows the main structures of the micro power generator of the embodiment in the power-generating state from another angle. With reference to FIGS. 3A and 3B, the first switch mechanism 44 separates the first clutch 3 from the cam structure 21. The first clutch 3 separates the first unidirectional stopper 42 from the first clockwork gear 41. The elastic energy stored in the first clockwork 43 is released to rotate the first clockwork gear 41, the first clockwork gear 41 rotates the first shaft gear 222, and the rotor unit 224 of the electromagnetic unit 22 is rotated to generate electricity.

In the embodiment above, the first shaft gear 222 and the first clockwork gear 41 are ratchet wheels. With reference to FIGS. 2A, 2B, 3A and 3B, in the energy-storing state, the first clockwork gear 41 is rotated in a first direction φ1. In the power-generating state, the first clockwork gear 41 is rotated in a second direction φ2. The first direction φ1 is opposite to the second direction φ2.

FIG. 4 shows the electromagnetic unit of an embodiment of the invention. The stator unit 223 is disposed in the cam structure. The rotor unit 224 rotates around the central shaft 221. The stator unit 223 and the rotor unit 224 are coaxially disposed. The design of the electromagnetic unit can be modified. The stator unit and the rotor unit disclosed are not meant to restrict the position of the permanent magnet and the coil. For example, the coil can be disposed in the stator unit or the rotor unit.

With reference to FIG. 1, in this embodiment, the first switch mechanism 44 comprises a first rod 441 and a first pushing member 442. The first rod 441 is connected to the first clockwork 43. When the micro power generator is switched to the power-generating state from the energy-storing state, the first clockwork 43 moves the first rod 441 to push the first pushing member 442, and the first pushing member 442 raises the first clutch 3 to separate the first clutch 3 from the cam structure 21. In one embodiment, the first pushing member 442 pivots on the first housing member 11.

In one embodiment, the first clockwork 43 is a torsion spring. The first clockwork 43 comprises a first outer loop 431. The first rod 441 comprises a first holder 443. The first holder 443 holds the first outer loop 431. In different embodiments, the first rod 441 can be pillar or another means of connection to connect to the first clockwork 43.

With reference to FIG. 1, in this embodiment, the micro power generator P further comprises a first positioning shaft 13 disposed on the second housing member 12. The first clockwork gear 41 rotates on the first positioning shaft 13. The first rod 441 slidably pivots on the first positioning shaft 13.

Figure 5A:
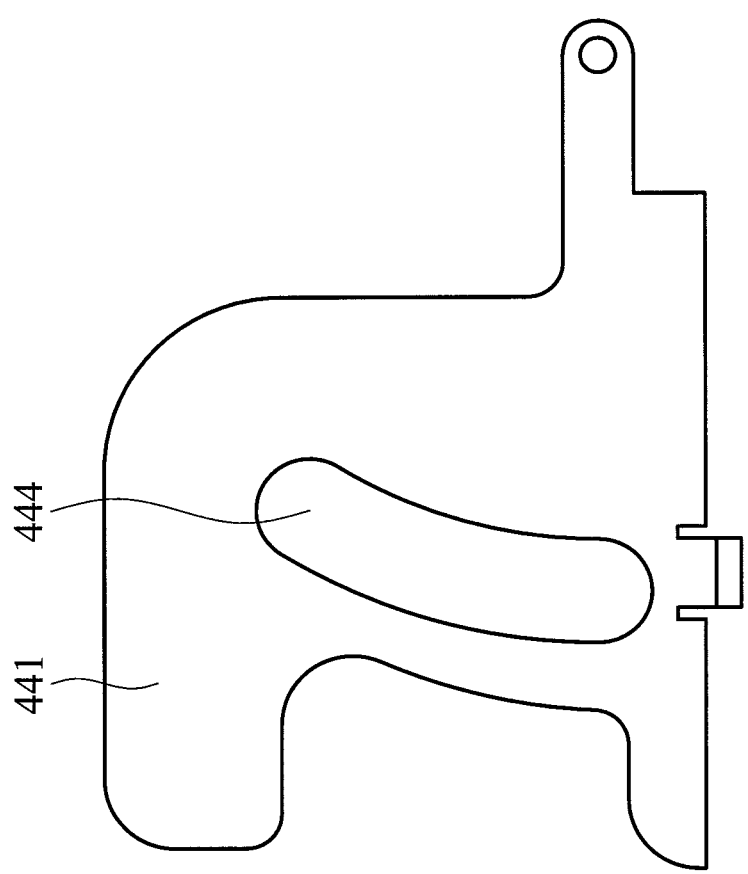
FIG. 5A shows a portion of the first rod of an embodiment of the invention.

FIG. 5A shows a portion of the first rod 441 of an embodiment of the invention. With reference to FIG. 5A, in one embodiment, the first rod 441 comprises a first slot 444. The first rod 441 slidably pivots on the first positioning shaft 13 through the first slot 444.

Figure 5B:
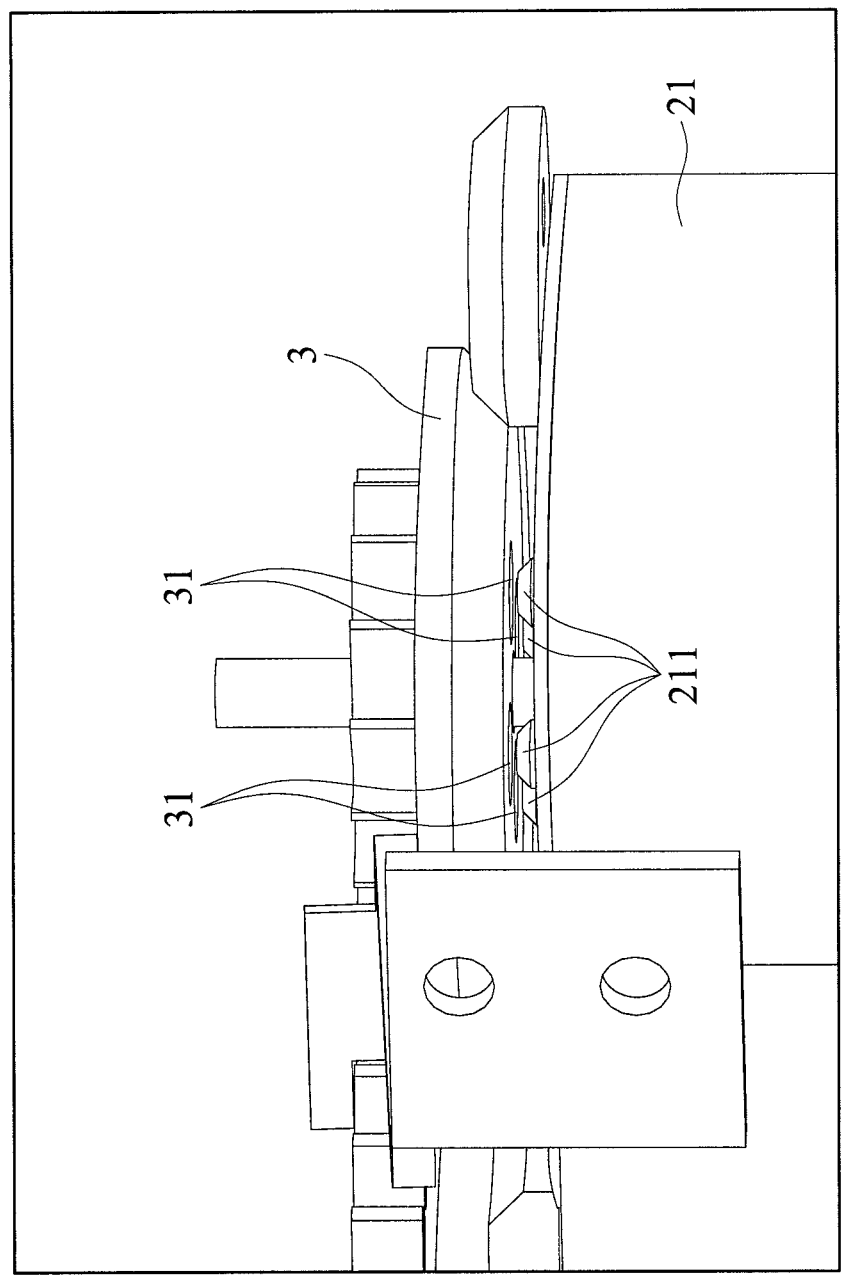
FIG. 5B shows a portion of the first clutch of an embodiment of the invention.

FIG. 5B shows a portion of the first clutch 3 of an embodiment of the invention. In one embodiment, the first clutch 3 comprises a first clutch positioning portion 31 (in this embodiment, the first clutch positioning portion 31 is a recess). The cam structure 21 comprises a first cam structure positioning portion 211 (in this embodiment, the first cam structure positioning portion 211 is a pillar). In the energy-storing state, the first clutch positioning portion 31 is connected to the first cam structure positioning portion 211. In the power-generating state, the first clutch positioning portion 31 is separated from the first cam structure positioning portion 211.

Figure 6A:
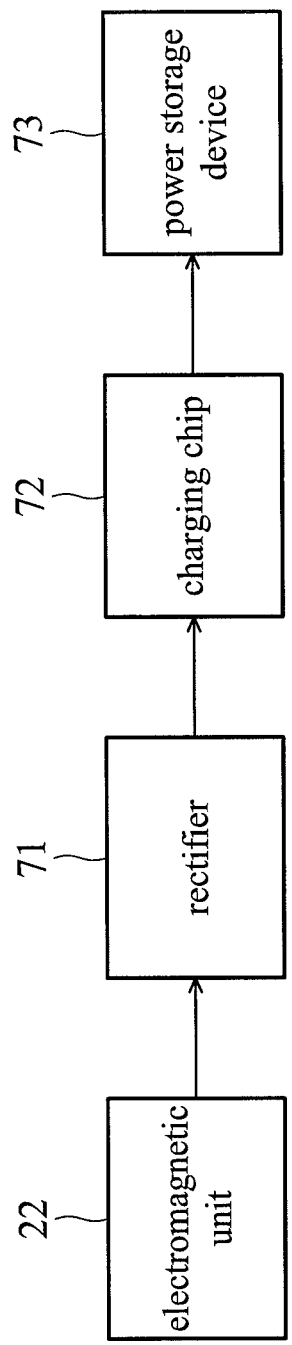
FIG. 6A is a block diagram of the circuit of the micro power generator of an embodiment of the invention.

With reference to FIG. 6A, in one embodiment, the micro power generator further comprises a rectifier 71 and a charging chip 72. The electromagnetic unit 22 is coupled to the rectifier 71. The rectifier 71 is coupled to the charging chip 72. The charging chip 72 is coupled to a power storage device 73. The power storage device 73 can be a lithium battery. In one embodiment, the rectifier 71 and the charging chip 72 can be disposed on a circuit board. The circuit board can be disposed between the first energy converting unit and the second energy converting unit.

Figure 6B:
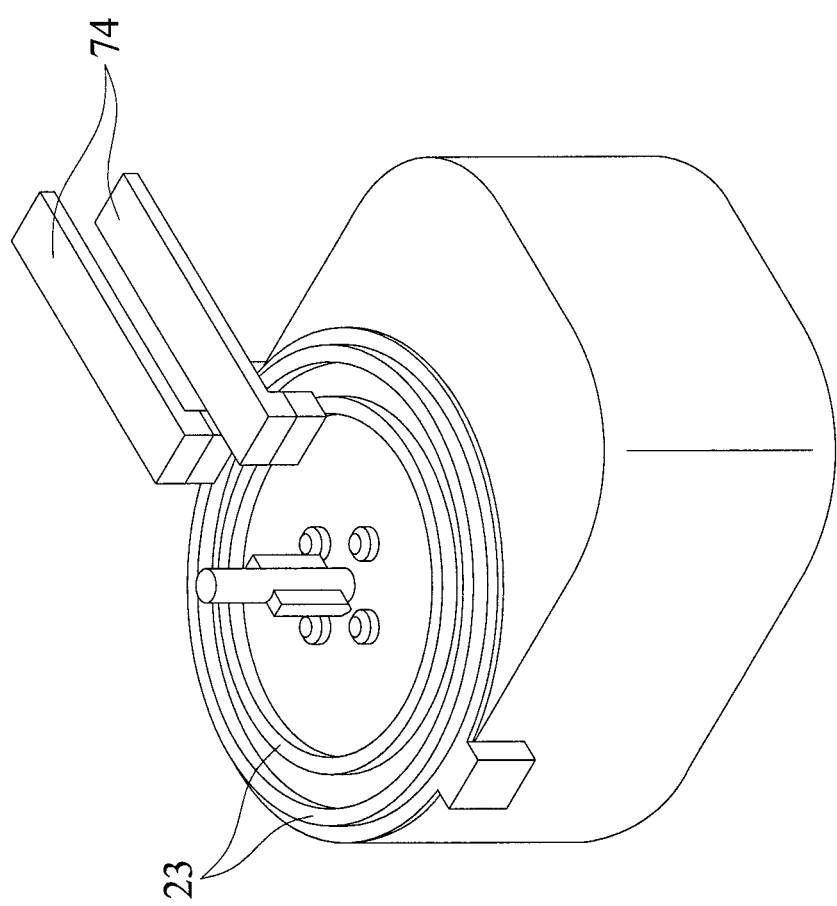
FIG. 6B shows the conductive rail and the electric brushes of an embodiment of the invention.

With reference to FIG. 6B, in one embodiment, the electricity generated by the electromagnetic unit can be transmitted by a conductive rail 23 and electric brushes 74 to prevent the wire winding problem.

With reference to FIG. 1, in one embodiment, the micro power generator P further comprises a first spring 81 and a second spring 82 disposed on the second housing member 12. When the cam structure 21 is in a first orientation, the first spring 81 pushes the cam structure 21. When the cam structure 21 is in a second orientation, the second spring 82 pushes the cam structure 21. The first spring 81 and the second spring 82 restrict the rotation range of the cam structure 21 to improve energy conversion efficiency. In different embodiment, the first spring 81 and the second spring 82 prevent the wire from winding.

The micro power generator of the embodiment of the invention generates electricity from the movement of the pet or child wearing the device. A tracker utilizing the micro power generator of the embodiment can be charged to extend battery life, and the opportunity to find a lost pet or kid is therefore increased.

Figure 7:
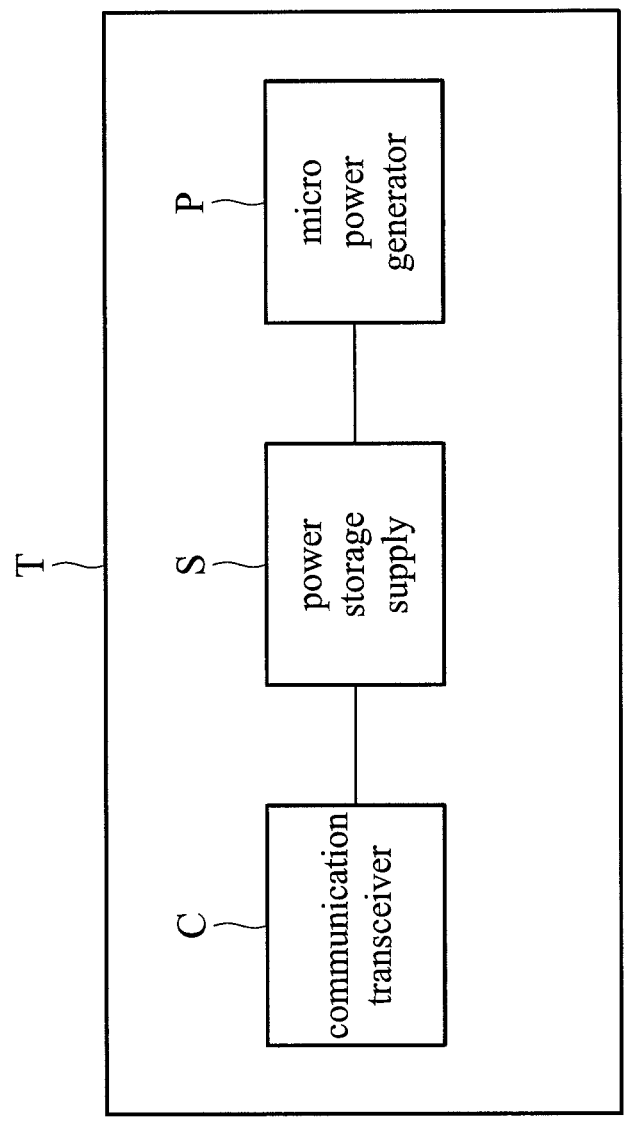
FIG. 7 is block diagram of a tracker of an embodiment of the invention.

With reference to FIG. 7, in one embodiment, a tracker T is provided. The tracker T is capable of generating and delivering location signals. The tracker T includes a power storage supply S, a communication transceiver C and the micro power generator P mentioned above. The communication transceiver C is electrically connected to the power storage supply S. The micro power generator P is electrically connected to the power storage supply S.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A micro power generator, comprising:
a cam structure;
an electromagnetic unit, partially disposed in the cam structure, wherein the electromagnetic unit comprises a central shaft and a first shaft gear, and the first shaft gear is rotated with the central shaft;
a first clutch, axially slidable on the central shaft, wherein the first clutch is rotated with the first shaft gear; and
a first energy converting unit, connected to the first shaft gear of the electromagnetic unit, wherein in an energy-storing state, the first clutch is connected to the cam structure and is moved with the cam structure and the first shaft gear to drive the first energy converting unit and to store kinetic energy of the cam structure to the first energy converting unit, and in a power-generating state, the first clutch is separated from the cam structure, and the first energy converting unit rotates the central shaft, and the electromagnetic unit generates electricity due to the rotation of the central shaft,
wherein the first shaft gear is axially slidable on the central shaft, the first energy converting unit comprises a first clockwork gear, a first unidirectional stopper, a first clockwork and a first switch mechanism, the first energy converting unit is moved with the first shaft gear by meshing the first clockwork gear and the first shaft gear, the first clockwork is moved with the first clockwork gear, and the first switch mechanism is connected to the first clockwork, wherein in the energy-storing state, the first unidirectional stopper abuts the first clockwork gear, and in the power-generating state, the first switch mechanism pushes against the first clutch thereby separating the first clutch from the cam structure, and the first clutch releases the first unidirectional stopper from the first clockwork gear.

2. The micro power generator as claimed in claim 1, wherein the first shaft gear and the first clockwork gear are ratchet wheels, in the energy-storing state, the first clockwork gear is rotated in a first direction, and in the power-generating state, the first clockwork gear is rotated in a second direction, wherein the first direction is opposite to the second direction.

3. The micro power generator as claimed in claim 1, wherein the electromagnetic unit comprises a motor, the motor comprises a stator unit and a rotor unit, the stator unit is coaxially disposed with the rotor unit, the stator is disposed in the cam structure, and the central shaft passes through and rotates with the rotor.

4. The micro power generator as claimed in claim 1, wherein the first switch mechanism comprises a first rod and a first pushing member, the first rod is connected to the first clockwork, and when the micro power generator is switched to the power-generating state from the energy-storing state, the first clockwork moves the first rod to push against in order to raise the first clutch to separate the first clutch from the cam structure.

5. The micro power generator as claimed in claim 4, wherein the first clockwork is a torsion spring, the first clockwork comprises a first outer loop, the first rod comprises a first holder, and the first holder is linked to the first outer loop.

6. The micro power generator as claimed in claim 4, further comprising a first positioning shaft, the first clockwork gear rotates about the first positioning shaft, and the first rod slidably pivots along the first positioning shaft.

7. The micro power generator as claimed in claim 6, wherein the first rod comprises a first slot, and the first rod slidably pivots on the first positioning shaft through the first slot.

8. The micro power generator as claimed in claim 1, wherein the first clutch comprises a first clutch positioning portion, the cam structure comprises a first cam structure positioning portion, in the energy-storing state, the first clutch positioning portion is connected to the first cam structure positioning portion, and in the power-generating state, the first clutch positioning portion is separated from the first cam structure positioning portion.

9. The micro power generator as claimed in claim 1, further comprising:
a second clutch, telescoped on the central shaft, wherein the second clutch is axially slidable on the central shaft; and
a second energy converting unit, wherein in the energy-storing state, the second clutch is connected to the cam structure and is moved with the cam structure to store the kinetic energy of the cam structure to the second energy converting unit, and in the power-generating state, the second clutch is separated from the cam structure, and the second energy converting unit rotates the central shaft, and the electromagnetic unit generates electricity power from the rotation of the central shaft, wherein the cam structure is located between the first clutch and the second clutch.

10. The micro power generator as claimed in claim 1, further comprising:
a rectifier; and
a charging chip, wherein the electromagnetic unit is coupled to the rectifier, the rectifier is coupled to the charging chip, and the charging chip is coupled to a power storage device.

11. A micro power generator adapted to be operated in an energy-storing state and a power-generating state, the micro power generator comprising:
a cam structure, rotatable about a central shaft and having a motor coaxially disposed therein, wherein the motor is rotatable about the central shaft;
a first clutch, slidably movable along the central shaft to be connected to or separated from the cam structure;
a first shaft gear, disposed on and interlocked to the first clutch, and being slidably movable along the central shaft with the first clutch;
a first clockwork gear, meshed with the first shaft gear;
a first clockwork, connected and interlocked to the first clockwork gear, and capable of being winded to store kinetic energy;
a first unidirectional stopper, interlocked to the first clutch and being moved to mesh with or release from the first clockwork gear, wherein the first unidirectional stopper only allows the first clockwork gear to rotate in a winding direction of the first clockwork when meshing with the first clockwork gear;
a first switch mechanism, connected and interlocked to the first clockwork to be moved toward or away from the first clutch, wherein when the micro power generator is operated in the energy-storing state, the first clutch is connected to the cam structure, the first unidirectional stopper is meshed with the first clockwork gear, and the motion of the cam structure drives the first clockwork gear to be rotated in the winding direction to wind up the first clockwork for storing kinetic energy, and when the micro power generator is operated in the power-generating state, the first switch mechanism moves toward and pushes against the first clutch to separate the first clutch from the cam structure, the first unidirectional stopper releases from the first clockwork gear, and the first clockwork releases the kinetic energy stored and drives the motor to generate electricity power.

12. The micro power generator as claimed in claim 11, wherein the first shaft gear and the first clockwork gear are ratchet wheels.

13. The micro power generator as claimed in claim 11, wherein the motor comprises a stator unit and a rotor unit, the stator unit is coaxially disposed with the rotor unit, the stator is disposed in the cam structure, and the central shaft passes through and rotates with the rotor.

14. The micro power generator as claimed in claim 11, wherein the first switch mechanism comprises a first rod and a first pushing member, the first rod is interlocked to the first clockwork, and when the micro power generator is switched to the power-generating state from the energy-storing state, the first clockwork moves the first rod to push against in order to raise the first clutch to separate the first clutch from the cam structure.

15. The micro power generator as claimed in claim 11, wherein the first clockwork is a torsion spring, the first clockwork comprises a first outer loop, the first rod comprises a first holder, and the first holder is linked to the first outer loop.

16. The micro power generator as claimed in claim 11, further comprising a first positioning shaft, the first clockwork gear rotates about the first positioning shaft, and the first rod slidably pivots along the first positioning shaft.

17. The micro power generator as claimed in claim 11, further comprising:
a rectifier; and a charging chip, wherein the electromagnetic unit is coupled to the rectifier, the rectifier is coupled to the charging chip, and the charging chip is coupled to a power storage device.

18. A tracker, capable of generating and delivering location signals, the tracker comprising:
- a power storage supply;
- a communication transceiver, electrically connected to the power storage supply;
- a micro power generator, electrically connected to the power storage supply, the micro power generator comprising:
- a cam structure;
- an electromagnetic unit, partially disposed in the cam structure, wherein the electromagnetic unit comprises a central shaft and a first shaft gear, and the first shaft gear is rotated with the central shaft;
- a first clutch, axially slidable on the central shaft, wherein the first clutch is rotated with the first shaft gear; and
- a first energy converting unit, connected to the first shaft gear of the electromagnetic unit, wherein in an energy-storing state, the first clutch is connected to the cam structure and is moved with the cam structure and the first shaft gear to drive the first energy converting unit and to store kinetic energy of the cam structure to the first energy converting unit, and in a power-generating state, the first clutch is separated from the cam structure, and the first energy converting unit rotates the central shaft, and the electromagnetic unit generates electricity due to the rotation of the central shaft, wherein the first shaft gear is axially slidable on the central shaft, the first energy converting unit comprises a first clockwork gear, a first unidirectional stopper, a first clockwork and a first switch mechanism, the first energy converting unit is moved with the first shaft gear by meshing the first clockwork gear and the first shaft gear, the first clockwork is moved with the first clockwork gear, and the first switch mechanism is connected to the first clockwork, wherein in the energy-storing state, the first unidirectional stopper abuts the first clockwork gear, and in the power-generating state, the first switch mechanism pushes against the first clutch thereby separating the first clutch from the cam structure, and the first clutch releases the first unidirectional stopper from the first clockwork gear.

\* \* \* \* \*